(12) United States Patent
Hirano et al.

(10) Patent No.: US 12,046,418 B2
(45) Date of Patent: Jul. 23, 2024

(54) SOLENOID

(71) Applicant: DENSO CORPORATION, Kariya (JP)

(72) Inventors: Akinori Hirano, Kariya (JP); Syodai Tomita, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 17/752,110

(22) Filed: May 24, 2022

(65) Prior Publication Data

US 2022/0285066 A1 Sep. 8, 2022

Related U.S. Application Data

(63) Continuation of application No. PCT/JP2020/041940, filed on Nov. 10, 2020.

(30) Foreign Application Priority Data

Nov. 28, 2019 (JP) ................................. 2019-214976

(51) Int. Cl.
*F16K 31/06* (2006.01)
*H01F 7/08* (2006.01)
(Continued)

(52) U.S. Cl.
CPC .......... *H01F 7/16* (2013.01); *F16K 31/0675* (2013.01); *H01F 7/081* (2013.01); *H01F 7/127* (2013.01);
(Continued)

(58) Field of Classification Search
CPC ............... F16K 31/0675; F16K 27/048; F16K 31/0613; F16K 31/0693; H01F 7/081; H01F 2007/083; H01F 2007/085
See application file for complete search history.

(56) References Cited

U.S. PATENT DOCUMENTS 6,953,186 B2 * 10/2005 Kaneda ................... F16K 39/04
251/129.21
7,468,647 B2 * 12/2008 Ishibashi ............. F16K 31/0613
335/220
(Continued)

FOREIGN PATENT DOCUMENTS

JP 2008-303961 12/2008
JP 2020-088144 6/2020
(Continued)

*Primary Examiner* — Matthew W Jellett
(74) *Attorney, Agent, or Firm* — Nixon & Vanderhye P.C.

(57) ABSTRACT

A solenoid includes a coil portion, a yoke having a cylindrical portion and a bottom portion and accommodating the coil portion, a plunger configured to slide in an axial direction, a stator core. The stator core has a magnetic attraction core, and a sliding core having a cylindrical core portion, a first magnetic flux transfer portion configured to transfer a flux between the yoke and the core portion, and a magnetic flux passage suppressing portion configured to suppress passage of magnetic flux between the sliding core and the magnetic attraction core. A second magnetic flux transfer portion is arranged on a radial outside of the magnetic attraction core end portion and transfers the magnetic flux between the magnetic attraction core and the cylindrical portion. The first magnetic flux transfer portion is gap-fitted in the cylindrical portion.

5 Claims, 6 Drawing Sheets

(51) Int. Cl.
  *H01F 7/127*  (2006.01)
  *H01F 7/16*  (2006.01)
(52) U.S. Cl.
  CPC .................. *H01F 2007/083* (2013.01); *H01F 2007/1692* (2013.01)

(56) References Cited

U.S. PATENT DOCUMENTS

| | | | |
|---|---|---|---|
| 9,076,583 B2* | 7/2015 | Ando | ..................... H01F 7/127 |
| 2006/0243938 A1 | 11/2006 | Ishibashi et al. | |
| 2007/0075283 A1* | 4/2007 | Hirano | .................. F16K 31/061 251/11 |
| 2015/0280541 A1 | 10/2015 | Ando et al. | |
| 2016/0172091 A1 | 6/2016 | Ott | |
| 2017/0314700 A1* | 11/2017 | Iwanaga | ............. F16K 31/0675 |
| 2020/0332910 A1 | 10/2020 | Furukawa et al. | |
| 2021/0278007 A1 | 9/2021 | Sasao et al. | |
| 2021/0278008 A1 | 9/2021 | Sasao | |

FOREIGN PATENT DOCUMENTS

| | | |
|---|---|---|
| JP | 2021-017942 | 2/2021 |
| JP | 2021-017943 | 2/2021 |

\* cited by examiner

SOLENOID

CROSS REFERENCE TO RELATED APPLICATIONS

This application is a continuation application of International Patent Application No. PCT/JP2020/041940 filed on Nov. 10, 2020, which designated the U.S. and based on and claims the benefits of priority of Japanese Patent Application No. 2019-214976 filed on Nov. 28, 2019. The entire disclosure of all of the above applications is incorporated herein by reference.

TECHNICAL FIELD

The present disclosure relates to a solenoid.

BACKGROUND

Conventionally, a solenoid has a coil that generates a magnetic force when energized, a stator core provided inside the coil, and a plunger that slides inside the stator core.

SUMMARY

A technique capable of suppressing deterioration of assemblability while suppressing deterioration of slidability due to a side force is desired.

The present disclosure can be realized as the following embodiment.

According to one aspect of the present disclosure, a solenoid is provided. A solenoid includes a coil portion configured to generate a magnetic flux when energized, a yoke having a cylindrical portion along an axial direction and a bottom portion formed along a direction intersecting the axial direction and accommodating the coil portion, a plunger configured to slide in an axial direction, a stator core. The stator core has a magnetic attraction core arranged in the axial direction to face a distal end surface of the plunger and configured to attract magnetically the plunger by a magnetic force generated by the coil portion, and a sliding core having a tubular core portion arranged inside the coil portion in a radial direction orthogonal to the axial direction and accommodating the plunger, and a first magnetic flux transfer portion formed from a core end portion which is an axial end portion of the core portion and faces the bottom portion toward an outside in the radial direction so as to transfer magnetic flux between the yoke and the core portion, and a magnetic flux passage suppressing portion configured to suppress passage of magnetic flux between the sliding core and the magnetic attraction core. A second magnetic flux transfer portion that is disposed radially outside a magnetic attraction core end portion, which is an end in the axial direction of the magnetic attraction core and is opposite to a side facing the distal end surface, and is configured to transfer the magnetic flux between the magnetic attraction core and the cylindrical portion. The first magnetic flux transfer portion is gap-fitted in the cylindrical portion.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
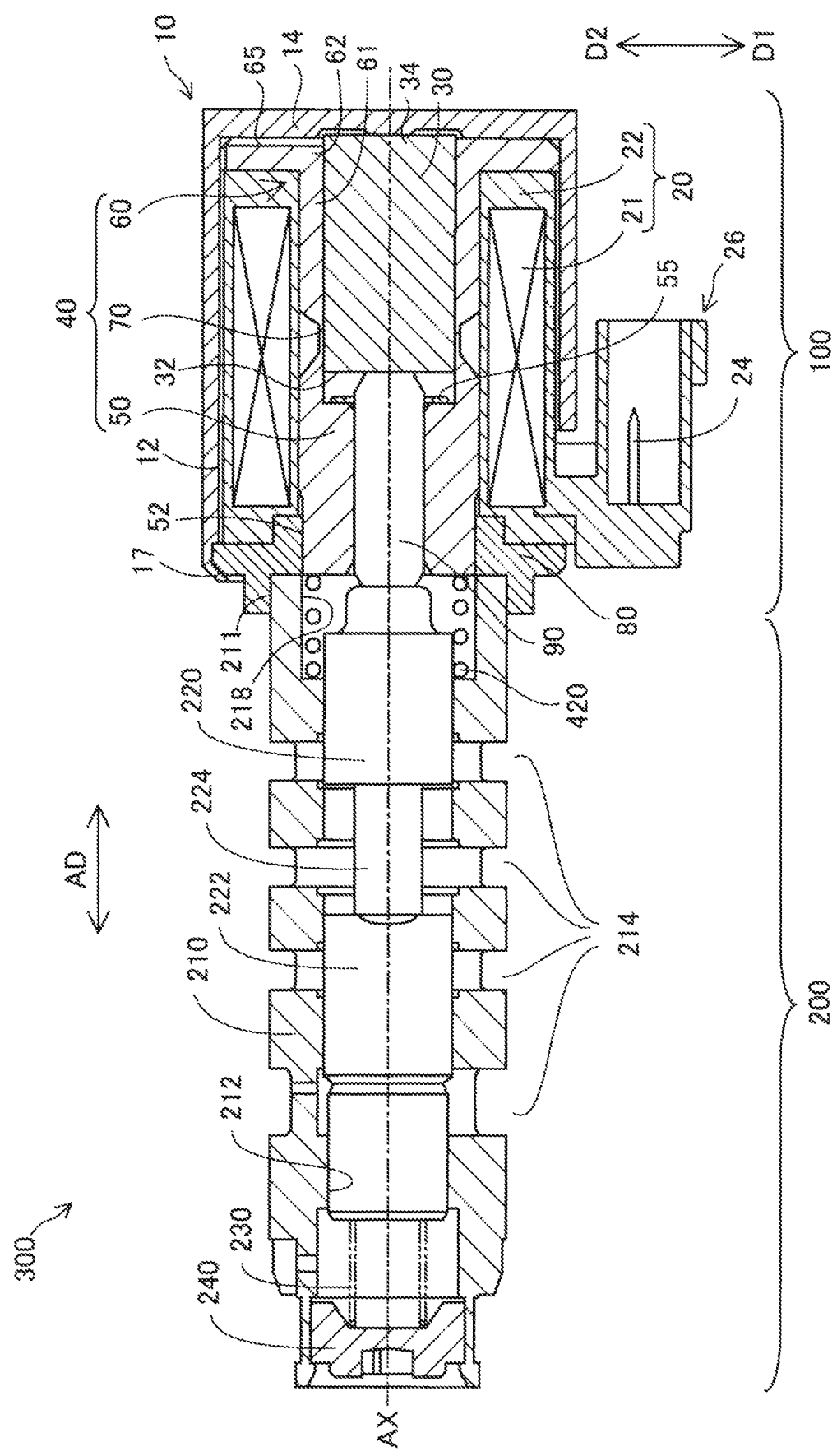
FIG. 1 is a cross-sectional view showing a schematic configuration of a linear solenoid valve to which a solenoid according to a first embodiment is applied.

In an assumable example, a solenoid has a coil that generates a magnetic force when energized, a stator core provided inside the coil, and a plunger that slides inside the stator core. In the solenoid, a magnetic ring core is arranged on an outer periphery of the stator core on a bottom side of a yoke. As a result, a magnetic circuit component such as the yoke and the stator core are magnetically coupled via the ring core, and a decrease in magnetic force due to an assembly gap between the magnetic circuit component and the stator core is suppressed.

In the solenoid, the ring core is configured to be movable in a radial direction. If the ring core is assembled eccentrically with respect to a sliding core, a deviation in the radial direction may occur depending on a size of a gap between the sliding core and the ring core. As a result, in a distribution of a magnetic flux transmitted to the sliding core and a plunger through the ring core, the deviation in the radial direction may occur, and an attractive force in the radial direction may be generated as a side force. If the side force increases, the slidability of the plunger may deteriorate. Therefore, the disclosers of the present application have assumed a configuration in which the ring core provided on the outer periphery of the stator core on the bottom side of the yoke is integrated with the sliding core, and the base portion that transfers the magnetic flux to the opening side of the yoke is separated from the stator core. However, in such a configuration, if a radial gap is provided between the ring core and the yoke to secure a breathing path, a central axis of the stator core and a central axis of the yoke will be displaced during assembly. As a result, the disclosers of the present application have found that the assemblability when the base portion is inserted between the outer peripheral surface of the stator core and the inner peripheral surface of the opening portion of the yoke may be deteriorated. Therefore, a technique capable of suppressing deterioration of assemblability while suppressing deterioration of slidability due to a side force is desired.

The present disclosure can be realized as the following embodiments.

According to one aspect of the present disclosure, a solenoid is provided. A solenoid includes a coil portion configured to generate a magnetic flux when energized, a yoke having a cylindrical portion along an axial direction and a bottom portion formed along a direction intersecting the axial direction and accommodating the coil portion, a plunger configured to slide in an axial direction, a stator core. The stator core has a magnetic attraction core arranged in the axial direction to face a distal end surface of the plunger and configured to attract magnetically the plunger by a magnetic force generated by the coil portion, and a sliding core having a tubular core portion arranged inside the coil portion in a radial direction orthogonal to the axial direction and accommodating the plunger, and a first magnetic flux transfer portion formed from a core end portion which is an axial end portion of the core portion and faces the bottom portion toward an outside in the radial direction so as to transfer magnetic flux between the yoke and the core portion, and a magnetic flux passage suppressing portion configured to suppress passage of magnetic flux between the sliding core and the magnetic attraction core. A second magnetic flux transfer portion that is disposed radially outside a magnetic attraction core end portion, which is an end in the axial direction of the magnetic attraction core and is opposite to a side facing the distal end surface, and is configured to transfer the magnetic flux between the magnetic attraction core and the cylindrical portion. The first magnetic flux transfer portion is gap-fitted in the cylindrical portion.

According to the solenoid of the embodiment described above, the sliding core has the tubular core portion arranged radially outside the plunger and the magnetic flux transfer portion formed from the core end of the core portion toward the outside in the radial direction to transfer the magnetic flux. Therefore, there is almost no radial gap between the core portion and the magnetic flux transfer portion. It is possible to prevent the core portion and the magnetic flux transfer portion from being eccentric. Therefore, due to such eccentricity, it is possible to suppress the occurrence of radial bias in the distribution of the magnetic flux transmitted from the magnetic flux transfer portion to the plunger 30 via the core portion. Therefore, it is possible to suppress an increase in side force due to a bias in the distribution of magnetic flux. Therefore, for example, as compared with a configuration in which a relatively large radial gap is formed between the cylindrical portion and the magnetic flux transfer portion in order to secure the breathing path, since the first magnetic flux transfer portion is gap-fitted in the cylindrical portion, it is possible to prevent the central axis of the yoke from being displaced during assembly. Therefore, when assembling the solenoid, it is possible to prevent the central axis of the magnetic attraction core end portion of the stator core, the second magnetic flux transfer portion and the cylindrical portion of the yoke from being displaced from each other. It is possible to suppress deterioration of the assemblability. Therefore, it is possible to suppress the deterioration of the assemblability while suppressing the deterioration of the slidability due to the side force.

The present disclosure can be realized as the following embodiments. For example, the present disclosure can be realized in the embodiment of a solenoid valve, a method of manufacturing a solenoid, and the like.

A. First Embodiment

A solenoid 100 according to the first embodiment shown in FIG. 1 is applied to a linear solenoid valve 300 and functions as an actuator for driving a spool valve 200. The linear solenoid valve 300 is configured to control a hydraulic pressure of hydraulic oil supplied to a vehicle automatic transmission (not shown), and is mounted on a valve body provided on an outer surface of a transmission case (not shown). The linear solenoid valve 300 of the present embodiment is used by being assembled to a valve body so that a position of a connector 26 described later in a circumferential direction is on a ground direction D1 side. In the present embodiment, the "ground direction D1" means not only a vertical downward direction indicated by the arrow in FIG. 1, but also the vertical downward direction rather than a horizontal direction. Therefore, the connector 26 is formed along a direction rotated at an angle of less than 90° with respect to the vertical downward direction in an assembled state. It is desirable that the ground direction D1 is −45° or more and +45° or less with respect to the vertical downward direction. The position of the connector 26 in the circumferential direction is determined according to a mounting condition of the linear solenoid valve 300. FIG. 1 schematically shows a cross section of the linear solenoid valve 300 taken along a central axis AX and the vertical direction.

Figure 2:
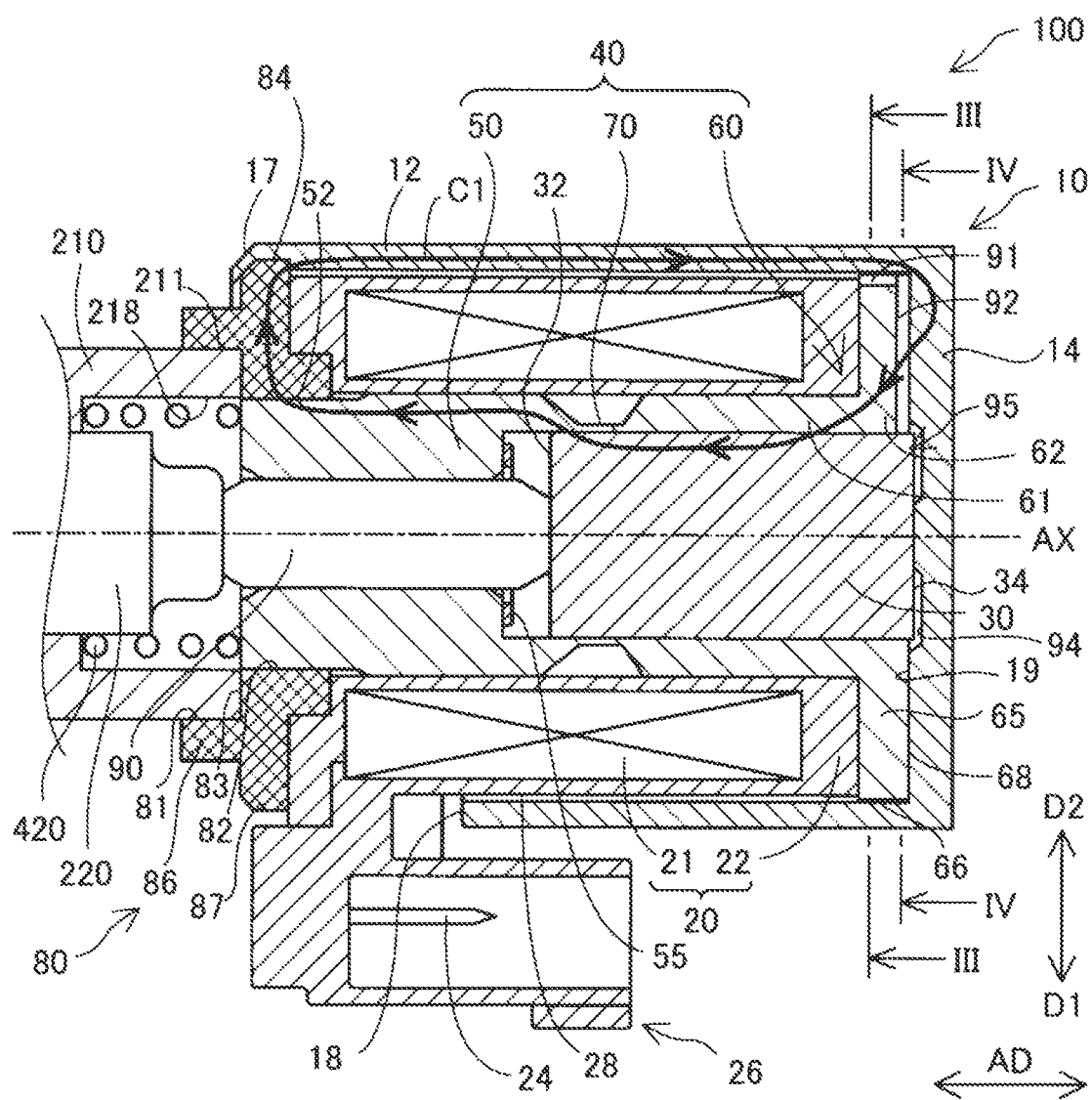
FIG. 2 is a cross-sectional view showing a detailed configuration of the solenoid.

The linear solenoid valve 300 includes the spool valve 200 and the solenoid 100 arranged side by side along the central axis AX. FIGS. 1 and 2 show the solenoid 100 and the linear solenoid valve 300 in a non-energized state. Although the linear solenoid valve 300 of the present embodiment is a normally closed type, it may be a normally open type.

The spool valve 200 shown in FIG. 1 adjusts an opening area of a plurality of oil ports 214 described later. The spool valve 200 includes a sleeve 210, a spool 220, a spring 230, and a spring load adjusting member 240.

The sleeve 210 has a substantially cylindrical external shape. The sleeve 210 is formed with an insertion hole 212 penetrating along the central axis AX and a plurality of oil ports 214 communicating with the insertion hole 212 and opening in a radial direction. The spool 220 is inserted into the insertion hole 212. An end of the insertion hole 212 on the solenoid 100 side is formed to have an enlarged diameter and functions as an elastic member accommodating portion 218. An elastic member 420 described later is accommodated in the elastic member accommodating portion 218. The plurality of oil ports 214 are formed side by side along a direction parallel to the central axis AX. The direction is hereinafter, referred to as an "axial direction AD". The plurality of oil ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the spool 220 based on the output hydraulic pressure. The drain port discharges the hydraulic oil. An outer peripheral surface 211 of the end portion on the solenoid 100 side in the axial direction AD of the sleeve 210 is fastened to an inside of a base portion 80 described later. In the present embodiment, a radial direction means a direction orthogonal to the axial direction AD.

The spool 220 has a plurality of large-diameter portions 222 and small-diameter portion 224 arranged side by side along the axial direction AD, and has a substantially rod-like external shape. The spool 220 slides along the axial direction AD inside the insertion hole 212, and adjusts the opening area of the plurality of oil ports 214 according to a position along the axial direction AD between the large-diameter portion 222 and the small-diameter portion 224. A shaft 90 for transmitting a thrust of the solenoid 100 to the spool 220 is in contact with the end of the spool 220 on the solenoid 100 side. The spring 230 is arranged at the other end of the spool 220. The spring 230 is configured by a compression coil spring, and presses the spool 220 in the axial direction AD to urge the spool 220 toward the solenoid 100. The spring load adjusting member 240 is arranged in contact with the spring 230, and adjusts the spring load of the spring 230 by adjusting an amount of screwing into the sleeve 210.

The solenoid 100 shown in FIGS. 1 and 2 is energized by an electronic control unit (not shown) to drive the spool valve 200. The solenoid 100 includes a yoke 10, a coil portion 20, a plunger 30, a stator core 40, and the base portion 80.

The yoke 10 is made of a magnetic metal, and forms an outer shell of the solenoid 100 as shown in FIG. 2. The yoke 10 has a bottomed cylindrical external shape, and accommodates the coil portion 20, the plunger 30, and the stator core 40. The yoke 10 has a cylindrical portion 12, a bottom portion 14, a thin-walled portion 17, and a notch portion 18.

The cylindrical portion 12 has a substantially cylindrical external shape along the axial direction AD, and is arranged outside the coil portion 20 in the radial direction. A magnetic flux transfer portion 65, which will be described later, is gap-fitted in the cylindrical portion 12.

The bottom portion 14 is formed at the end of the cylindrical portion 12 and perpendicular to the axial direction AD at the end of the side surface portion 12 opposite to the end opposite to the spool valve 200, and closes the end of the cylindrical portion 12. The bottom portion 14 is not limited to being perpendicular to the axial direction AD, and may be formed substantially perpendicularly, or may be formed to intersect with the axial direction AD according to the shape of a magnetic flux transfer portion 65 described later. The bottom portion 14 faces a base end surface 34 of the plunger 30 described later. In the following description, a space surrounded by the bottom portion 14, the stator core 40, and the shaft 90 is also referred to as a "plunger chamber 95". The plunger chamber 95 houses the plunger 30. In the present embodiment, an annular recess 94 centered on the central axis AX of the yoke 10 is formed on the inner surface of the bottom portion 14. The recess 94 is formed including a position facing an outer edge portion of the plunger 30 and a breathing hole 36 described later in the axial direction AD, and is configured so that a second breathing passage 92 and the breathing hole 36, which will be described later, can communicate with each other.

The thin-walled portion 17 is formed to be thinner than a thickness of the cylindrical portion 12 at the end portion of the cylindrical portion 12 on the spool valve 200 side. The thin-walled portion 17 constitutes an opening of the yoke 10.

The notch portion 18 is formed by cutting out a part of the thin-walled portion 17 in the circumferential direction. The notch portion 18 of the present embodiment is formed at a position in the circumferential direction which is the ground direction D1 in a state where the solenoid 100 is assembled (hereinafter, also referred to as an "assembled state"). The connector 26, which will be described later, is exposed from the yoke 10 via the notch portion 18. Further, the notch portion 18 functions as an inflow for flowing a fluid existing in a mounting environment of the solenoid 100 from the outside of the solenoid 100 into the inside of the solenoid 100. The fluid existing in the mounting environment of the solenoid 100 corresponds to a fluid such as hydraulic oil or air. The fluid that has flowed into the solenoid 100 through the notch portion 18 can also flow out to the outside of the solenoid 100 through the notch portion 18. That is, as the plunger 30 slides, the fluid can flow inside and outside the solenoid 100 through the notch portion 18.

The coil portion 20 has a substantially cylindrical external shape, and is arranged inside the cylindrical portion 12 of the yoke 10 in the radial direction. The coil portion 20 has a coil 21 and a bobbin 22. The coil 21 is formed of a conducting wire having an insulating coating. The bobbin 22 is made of resin, and the coil 21 is wound around the bobbin 22. The bobbin 22 is connected to the connector 26 arranged on the outer periphery of the yoke 10. The connector 26 is radially outwardly exposed from the yoke 10 through the notch portion 18. A connection terminal 24 to which the end of the coil 21 is connected is arranged inside the connector 26. The connector 26 electrically connects the solenoid 100 to the electronic control device via a connection line (not shown). The coil portion 20 generates a magnetic force when energized, and generates a loop-shaped magnetic flux passing through the cylindrical portion 12 of the yoke 10, the bottom portion 14 of the yoke 10, the stator core 40, the plunger 30, and the base portion 80 (a loop-shaped magnetic flux is hereinafter, referred to as a "magnetic circuit"). In the state shown in FIGS. 1 and 2, the energization of the coil portion 20 is not performed and a magnetic circuit is not formed. For convenience of explanation, a part of the magnetic circuit C1 formed when the energization of the coil portion 20 is performed is schematically indicated by a thick arrow in FIG. 2.

An outer diameter of the coil portion 20 is formed to be smaller than an inner diameter of the cylindrical portion 12 of the yoke 10. With such a configuration, a radial gap is formed over the entire circumference between the inner surface of the cylindrical portion 12 and the outer surface of the coil portion 20, and this gap functions as a breathing path 28 that communicates a first breathing passage 91 of a magnetic flux transfer portion 65, which will be described later, with the outside of the solenoid 100. The breathing path 28 communicates with the outside of the solenoid 100 through the notch portion 18 of the yoke 10 so as to circulate the fluid existing in the mounting environment of the solenoid 100. For example, in the mounting environment of the solenoid 100, when the notch portion 18 is immersed in the hydraulic oil, the hydraulic oil as a fluid is circulated, and when the notch portion 18 is located vertically above the storage level of the hydraulic oil, the air as a fluid is circulated.

Figure 3:
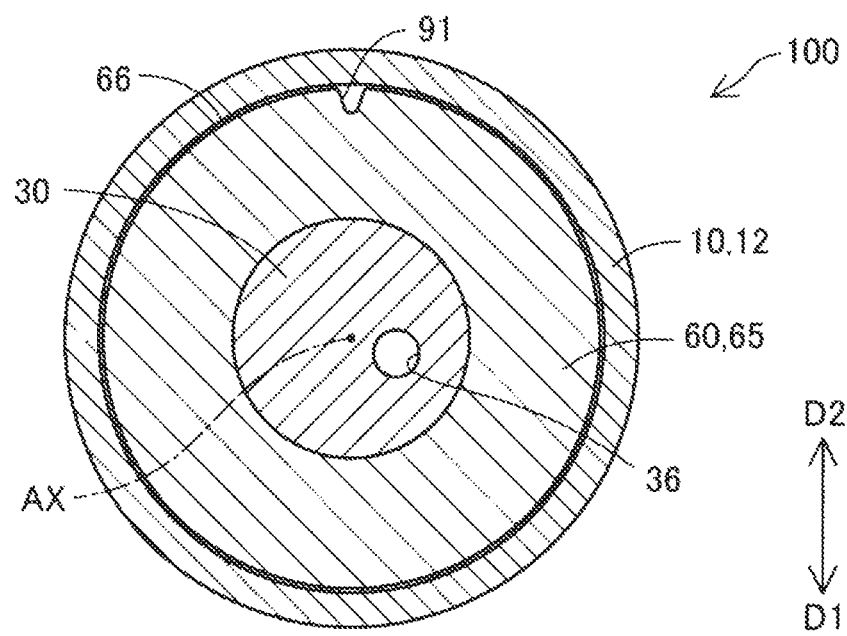
FIG. 3 is a cross-sectional view taken along a line III-III in FIG. 2.

The plunger 30 is housed in a plunger chamber 95. The plunger 30 has a substantially cylindrical external shape and is made of a magnetic metal. The plunger 30 slides in the axial direction AD on an inner peripheral surface of a core portion 61 of the stator core 40 described later. The above-described shaft 90 is disposed in contact with an end surface of the plunger 30 on the spool valve 200 side (hereinafter, also referred to as a "distal end surface 32"). Thereby, the plunger 30 is urged toward the bottom portion 14 side of the yoke 10 along the axial direction AD by the urging force of the spring 230 transmitted to the spool 220 shown in FIG. 1. As shown in FIG. 2, an end surface of the plunger 30 opposite to the distal end surface 32 (hereinafter, also referred to as a "base end surface 34") faces the bottom portion 14 of the yoke 10. As shown in FIG. 3, the plunger 30 is formed with a breathing hole 36 penetrating in the axial direction AD. As shown in FIG. 2, the breathing hole 36 allows the fluid located on the base end surface 34 side and the distal end surface 32 side of the plunger 30 to flow in the plunger chamber 95.

The stator core 40 is made of a magnetic metal, and is disposed between the coil portion 20 and the plunger 30. The stator core 40 is configured by a member in which a magnetic attraction core 50, a sliding core 60, and a magnetic flux passage suppressing portion 70 are integrated.

The magnetic attraction core 50 is disposed so as to surround the shaft 90 in a circumferential direction. The magnetic attraction core 50 constitutes a portion of the stator core 40 on the spool valve 200 side, and magnetically attracts the plunger 30 by the magnetic force generated by the coil portion 20. A stopper 55 is disposed on a surface of the magnetic attraction core 50 facing the distal end surface 32 of the plunger 30. The stopper 55 is made of a non-magnetic material, and suppresses a direct contact between the plunger 30 and the magnetic attraction core 50, and also prevents the plunger 30 from being separated from the magnetic attraction core 50 due to the magnetic attraction.

The sliding core 60 constitutes a portion of the stator core 40 on the bottom portion 14 side, and is disposed radially outside the plunger 30. The sliding core 60 has a core portion 61 and a magnetic flux transfer portion 65.

The core portion 61 has a substantially cylindrical external shape, and is arranged between the coil portion 20 and the plunger 30 in the radial direction. The core portion 61 guides the movement of the plunger 30 along the axial direction AD. As a result, the plunger 30 slides directly on an inner peripheral surface of the core portion 61. There is a sliding gap (not shown) between the core portion 61 and the plunger 30 for ensuring the slidability of the plunger 30. An end portion of the sliding core 60 that is located on an opposite side to the magnetic attraction core 50 side (hereinafter, also referred to as a "core end 62") is in contact with the bottom portion 14. FIG. 2 shows a cross section including the second breathing passage 92 formed in a vertical direction D2, which will be described later, and the sliding core 60 and the bottom portion 14 are not in contact with each other in the second breathing passage 92.

The magnetic flux transfer portion 65 is formed radially outward from the core end 62 over the entire circumference of the core end 62. Therefore, the magnetic flux transfer portion 65 is arranged between the bobbin 22 and the bottom portion 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom portion 14 of the yoke 10 and the plunger 30.

The magnetic flux transfer portion 65 of the present embodiment is integrally formed with the core portion 61 by forging. The magnetic flux transfer portion 65 and the core portion 61 may be integrated after being formed as separate bodies from each other. For example, the core portion 61 may be press-fitted into a through hole of the magnetic flux transfer portion 65 formed in a ring shape, or may be fixed by welding or the like after the core portion 61 is inserted into the through hole. The magnetic flux transfer portion 65 is gap-fitted in the cylindrical portion 12 of the yoke 10. In other words, the clearance between the outer diameter of the magnetic flux transfer portion 65 and the inner diameter of the cylindrical portion 12 is formed so that a gap fitting is possible.

As shown in FIG. 3, the first breathing passage 91 is formed on an outer peripheral surface 66 of the magnetic flux transfer portion 65 along the axial direction AD. The first breathing passage 91 communicates with the breathing path 28. In the present embodiment, the number of the first breathing passages 91 formed on the outer peripheral surface 66 of the magnetic flux transfer portion 65 is one. Further, in the present embodiment, the first breathing passage 91 has a linear groove shape, and is formed so as to be located in the vertical direction D2 in a state where the solenoid 100 is assembled. In the present embodiment, the "vertical direction D2" is not limited to the vertically upward direction indicated by the arrow in FIG. 3, but means a direction on the vertically upward direction side rather than the horizontal direction. Therefore, the first breathing passage 91 is formed in the assembled state along the direction rotated at an angle of less than 90° with respect to the vertically upward direction. The vertical direction D2 is preferably −45° or more and +45° or less with respect to the vertically upward direction.

Figure 4:
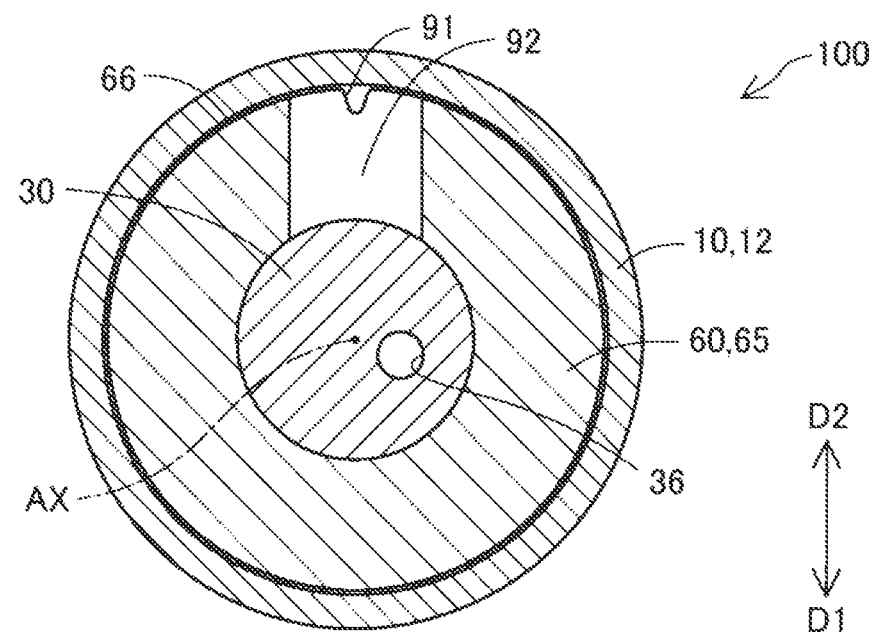
FIG. 4 is a cross-sectional view taken along the line IV-IV of FIG. 2.

As shown in FIG. 2, the magnetic flux transfer portion 65 is formed with a first facing surface 68 facing the bottom portion 14 of the yoke 10. As shown in FIG. 4, a second breathing passage 92 is formed on the first facing surface 68 of the magnetic flux transfer portion 65 along the radial direction. The second breathing passage 92 is formed to communicate the first breathing passage 91 with the plunger chamber 95. The second breathing passage 92 is formed as a groove having the axial AD in the first facing surface 68 as the depth direction. In the present embodiment, the second breathing passage 92 is formed at the same position in the circumferential direction as the first breathing passage 91. With such a configuration, the position of the second breathing passage 92 is formed in a range that is in the vertical direction D2 when the solenoid 100 is assembled. Further, in the present embodiment, the second breathing passage 92 has a linear groove shape along the vertical direction. In the following description, the portion of the bottom portion 14 of the yoke 10 facing the first facing surface 68 is also referred to as a "second facing surface 19" as shown in FIG. 2.

A magnetic flux passage suppressing portion 70 shown in FIG. 2 is formed between the magnetic attraction core 50 and the core portion 61 in the axial direction AD. The magnetic flux passage suppressing portion 70 suppresses the flow of magnetic flux directly between the core portion 61 and the magnetic attraction core 50. The magnetic flux passage suppressing portion 70 of the present embodiment is configured such that a radial thickness of the stator core 40 is formed to be thin, so that the magnetic resistance of the magnetic flux passage suppressing portion 70 is higher than that of the magnetic attraction core 50 and the core portion 61. The magnetic flux passage suppressing portion 70 may be configured to physically connect the magnetic attraction core 50 and the sliding core 60, which are formed separately from each other, by a non-magnetic material.

The stator core 40 is urged toward the bottom portion 14 side in the axial AD by the elastic member 420 accommodated in the elastic member accommodating portion 218 formed in the sleeve 210 of the spool valve 200. The elastic member 420 is arranged in contact with the end surface of the magnetic attraction core 50 in the axial direction AD and on the side opposite to the plunger 30 side. In the present embodiment, the elastic member 420 is configured by a compression coil spring having a substantially cylindrical external shape. The spool 220 is inserted radially inside the elastic member 420. Since the stator core 40 is urged in the axial direction AD toward the bottom portion 14 of the yoke 10 by the elastic member 420, the first magnetic flux transfer portion 65 is pressed against the bottom portion 14, and the magnetic flux transfer portion 65 is pressed to the bottom portion 14. Therefore, the loss of the magnetic flux transmitted from the bottom portion 14 of the yoke 10 to the magnetic flux transfer portion 65 is suppressed.

The base portion 80 is arranged on the radial outer side of the end portion (hereinafter, also referred to as a "magnetic attraction core end portion 52") of the magnetic attraction core 50 of the stator core 40 in the axial direction AD and on the side opposite to the side facing the distal end surface 32. The base portion 80 has a substantially cylindrical external shape and is made of a magnetic metal. The base portion 80 transfers a magnetic flux between the magnetic attraction core 50 of the stator core 40 and the cylindrical portion 12 of the yoke 10. The base portion 80 has a first tubular portion 86 and a flange portion 87. The first outer peripheral surface 211 of the sleeve 210 is press-fitted into the first tubular portion 86, and the first tubular portion 86 is fastened to the outer peripheral surface 211. The flange portion 87 is connected in the axial direction AD with respect to the first tubular portion 86, and has an outer diameter larger than the outer diameter of the first tubular portion 86. The flange portion 87 is arranged on the outer side in the radial direction of the magnetic attraction core end portion 52 of the magnetic attraction core 50, and is in contact with the inner peripheral surface of the cylindrical portion 12 of the yoke 10. In the present embodiment, an inner diameter of the first tubular portion 86 is larger than an inner diameter of the flange portion 87, and an inner peripheral surface 81 of the first tubular portion 86 and an inner peripheral surface 82 of the flange portion 87 are connected by a connecting surface 83 that is substantially parallel in the radial direction. In the present embodiment, the end surface of the sleeve 210 in the axial direction AD is in contact with the connecting surface 83.

In the present embodiment, the yoke 10, the plunger 30, the stator core 40, and the base portion 80 are each made of iron, but are not limited to iron and may be made of any magnetic material such as nickel or cobalt. In the present embodiment, plating is applied on the outer peripheral surface of the plunger 30. By such a plating treatment, the surface hardness of the plunger 30 can be increased, and deterioration of slidability can be suppressed. Further, in the present embodiment, the yoke 10 is formed in a cup shape by press forming, and the stator core 40 is formed by forging, but each may be formed by any forming method. For example, the yoke 10 may be integrated by caulking fixing, press-fitting fixing, or the like after the cylindrical portion 12 and the bottom portion 14 are formed separately from each other.

The solenoid 100 of the present embodiment is assembled by inserting the members housed inside the yoke 10 in order from an opening formed by the thin-walled portion 17 of the yoke 10. More specifically, first, the stator core 40 in which the plunger 30 is housed inside the core portion 61 in the radial direction is inserted from the opening into the inside of the yoke 10. At this time, the magnetic flux transfer portion 65 is gap-fitted into the cylindrical portion 12 of the yoke 10. Therefore, there is an effect that the central axis AX of the stator core 40 and the central axis AX of the yoke 10 can be prevented from being displaced during assembly. Next, the coil portion 20 is inserted, and the base portion 80 is gap-fitted with the magnetic attraction core end portion 52 on the inner peripheral surface 82 of the flange portion 87. After that, the thin-walled portion 17 in contact with an outer peripheral surface 84 of the flange portion 87 is caulked and fixed to the base portion 80, so that the assembly of the solenoid 100 is completed. Instead of caulking, the cylindrical portion 12 and the base portion 80 of the yoke 10 may be fixed by any method such as welding. Further, the base portion 80 is not limited to being gap-fitted to the magnetic attraction core end portion 52, and may be fitted to the magnetic attraction core end portion 52 by providing a slight gap in the radial direction.

FIGS. 1 and 2 show a state in which the plunger 30 is farthest from the magnetic attraction core 50 without energizing the coil 21. Unlike the states shown in FIGS. 1 and 2, when the coil 21 is energized, a magnetic circuit C1 is formed inside the solenoid 100. The plunger 30 is drawn toward the magnetic attraction core 50 by the formation of the magnetic circuit C1 and slides on the inner peripheral surface of the core portion 61 in the axial direction AD. As the current flowing through the coil portion 20 increases, the magnetic flux density of the magnetic circuit C1 increases, and the stroke amount of the plunger 30 increases.

When the plunger 30 moves toward the magnetic attraction core 50, the shaft 90 abutting on the distal end surface 32 of the plunger 30 presses the spool 220 shown in FIG. 1 toward the spring 230. As a result, the opening area of the oil port 214 is adjusted, and a hydraulic pressure proportional to the value of the current flowing through the coil 21 is output.

The fluid such as hydraulic oil existing in the mounting environment of the solenoid 100 circulates the notch portion 18, the breathing path 28, the first breathing passage 91, the second breathing passage 92, the recess 94, and the breathing hole 36 with the stroke of the plunger 30. With such a configuration, since the plunger chamber 95 and the outside of the solenoid 100 are communicated with each other, the pressure fluctuation of the plunger chamber 95 due to the sliding of the plunger 30 is suppressed, and it is suppressed that the smooth sliding of the plunger 30 is hindered.

The fluid such as hydraulic oil existing in the mounting environment of the solenoid 100 may contain foreign matter such as abrasion powder. Such foreign matter may enter the breathing path 28 through the notch portion 18. The solenoid 100 of the present embodiment is formed so that the first breathing passage 91 and the second breathing passage 92 are located in the vertical direction D2 in the assembled state. Therefore, a passage path for the foreign matter flowing into the breathing path 28 from the notch portion 18 located in the ground direction D1 to reach the first breathing passage 91 and the second breathing passage 92 located in the vertical direction D2 is set to be relatively long. In the present embodiment, the foreign matter that has flowed into the breathing path 28 from the notch portion 18 located in the ground direction D1 needs to go around the breathing path 28 in the circumferential direction by half a circumference in order to reach the first breathing passage 91 located in the vertical direction D2. As described above, since the path through which the foreign matter passes has a so-called maze structure, the foreign matter flowing into the breathing path 28 is suppressed from entering the plunger chamber 95. In the present embodiment, the "maze structure" means a structure that forms a path that is more complicated and has a longer path length than a linear path.

As described above, in the sliding core 60 of the present embodiment, the core portion 61 and the magnetic flux transfer portion 65 are integrally formed. Therefore, there is almost no radial gap between the core portion 61 and the magnetic flux transfer portion 65, and it is possible to prevent the core portion 61 and the magnetic flux transfer portion 65 from being eccentric. Therefore, when a magnetic circuit C1 is formed by energization, it is possible to suppress the occurrence of radial bias in the distribution of the magnetic flux transmitted from the magnetic flux transfer portion 65 to the core portion 61, and suppress the occurrence of radial bias in the distribution of the magnetic flux transmitted from the core portion 61 to the plunger 30. In other words, according to the solenoid 100 of the present embodiment, the magnetic flux densities of the magnetic circuit C1 can be made substantially equal in the circumferential direction. Therefore, it is possible to suppress an increase in side force due to a bias in the distribution of magnetic flux, and it is possible to suppress deterioration of the slidability of the plunger 30.

In the present embodiment, the magnetic flux transfer portion 65 corresponds to the first magnetic flux transfer portion in the present disclosure, and the base portion 80 corresponds to the second magnetic flux transfer portion.

According to the solenoid 100 of the first embodiment described above, the sliding core 60 has the tubular core portion 61 arranged radially outside the plunger 30 and the magnetic flux transfer portion 65 formed from the core end 62 of the core portion 61 toward the outside in the radial direction to transfer the magnetic flux. Therefore, there is almost no radial gap between the core portion 61 and the magnetic flux transfer portion 65. It is possible to prevent the core portion 61 and the magnetic flux transfer portion 65 from being eccentric. Therefore, due to such eccentricity, it is possible to suppress the occurrence of radial bias in the distribution of the magnetic flux transmitted from the magnetic flux transfer portion 65 to the plunger 30 via the core portion 61. Therefore, it is possible to suppress an increase in side force due to a bias in the distribution of magnetic flux.

In addition, the magnetic flux transfer portion 65 is gap-fitted in the cylindrical portion 12 of the yoke 10. Therefore, for example, as compared with a configuration in which a relatively large radial gap is formed between the cylindrical portion 12 and the magnetic flux transfer portion 65 in order to secure the breathing path, it is possible to prevent the central axis AX of the stator core 40 and the central axis AX of the yoke 10 from being displaced during assembly. Therefore, when assembling the solenoid 100, it is possible to prevent the central axis AX of the magnetic attraction core end portion 52 of the stator core 40, the base portion 80, and the thin-walled portion 17 of the yoke 10 from being displaced from each other. It is possible to suppress deterioration of the assemblability when the base portion 80 is inserted between the outer peripheral surface of the magnetic attraction core end portion 52 and the inner peripheral surface of the thin-walled portion 17 of the yoke 10. Therefore, it is possible to suppress the deterioration of the assemblability while suppressing the deterioration of the slidability due to the side force.

Unlike the solenoid 100 of the first embodiment, in the configuration in which the magnetic flux transfer portion is press-fitted into the cylindrical portion of the yoke, the magnetic transfer portion is inserted through the opening of the yoke and press-the cylindrical portion of the yoke is used when the magnetic flux transfer portion is inserted through the opening of the yoke and press-fitted in the assembly work. At that time, high dimensional accuracy is required due to a long insertion distance of the magnetic flux transfer portion with respect to the cylindrical portion of the yoke along the axial direction AD. Further, if a step is provided in the inner diameter of the cylindrical portion of the yoke in order to shorten the insertion distance, the structuring of the yoke becomes complicated. Further, in order to shorten the insertion distance, when the cylindrical portion and the bottom portion of the yoke are formed separately and the magnetic flux transfer portion is press-fitted from the opening formed on the bottom side of the cylindrical portion of the yoke, the number of parts of the yoke increases and the manufacturing process becomes complicated. Further, in the configuration in which the magnetic flux transfer portion is press-fitted into the cylindrical portion of the yoke, high dimensional accuracy is required in order to bring the bottom portion of the yoke into contact with the first facing surface of the magnetic flux transfer portion. Further, a structure that absorbs manufacturing errors is required.

On the other hand, according to the solenoid 100 of the first embodiment, since the magnetic flux transfer portion 65 is gap-fitted in the cylindrical portion 12 of the yoke 10, it is possible to suppress the requirement for high dimensional accuracy for the yoke 10 and the sliding core 60. Further, since the structure of the yoke 10 can be suppressed from becoming complicated and the number of parts can be suppressed, the yoke 10 can be easily formed by press molding.

Further, in the solenoid 100 of the first embodiment, the first breathing passage 91 along the axial direction AD is formed on the outer peripheral surface 66 of the magnetic flux transfer portion 65, and the second breathing passage 92 is formed on the first facing surface 68 of the magnetic flux transfer portion 65 along the radial direction. Therefore, the breathing path 28 and the breathing hole 36 can be communicated with each other through the first breathing passage 91 and the second breathing passage 92, and the fluid can be circulated between the plunger chamber 95 and the outside of the solenoid 100. It is possible to suppress fluctuations in the pressure of the plunger chamber 95 due to the sliding of the plunger 30. Therefore, it is possible to prevent the smooth sliding of the plunger 30 from being hindered.

Further, since the first breathing passage 91 is formed on the outer peripheral surface 66 of the magnetic flux transfer portion 65, when the stator core 40 is inserted into the yoke 10, the position of the first breathing passage 91 in the circumferential direction can be easily confirmed by visual inspection or the like. Therefore, it is possible to prevent the stator core 40 from being erroneously assembled at the circumferential position with respect to the yoke 10, and it is possible to prevent the directions of the first breathing passage 91 and the second breathing passage 92 from being displaced from the desired directions.

Further, since both the first breathing passage 91 and the second breathing passage 92 are formed in the magnetic flux transfer portion 65, the positions of the first breathing passage 91 and the second breathing passage 92 in the circumferential direction can be regulated only by the stator core 40. Therefore, when assembling the solenoid 100, the step of adjusting the position of the first breathing passage 91 in the circumferential direction with respect to the second breathing passage 92 can be omitted.

Further, since the first breathing passage 91 and the second breathing passage 92 are formed in the same circumferential position, the breathing path along the circumferential direction for communicating the first breathing passage 91 and the second breathing passage 92 can be omitted. Therefore, it is possible to prevent the structure of the magnetic flux transfer portion 65 from becoming complicated, and it is possible to suppress an increase in the manufacturing process of the stator core 40.

Further, since the second breathing passage 92 formed along the radial direction is formed in the range of the vertical direction D2 in the state where the solenoid is assembled, a so-called maze structure can be realized. Therefore, it is possible to prevent foreign matter flowing into the breathing path 28 from the notch portion 18 located in the ground direction D1 from reaching the plunger chamber 95. Therefore, it is possible to prevent the slidability of the plunger 30 from deteriorating due to the foreign matter flowing into the plunger chamber 95.

B. Second Embodiment

Figure 5:
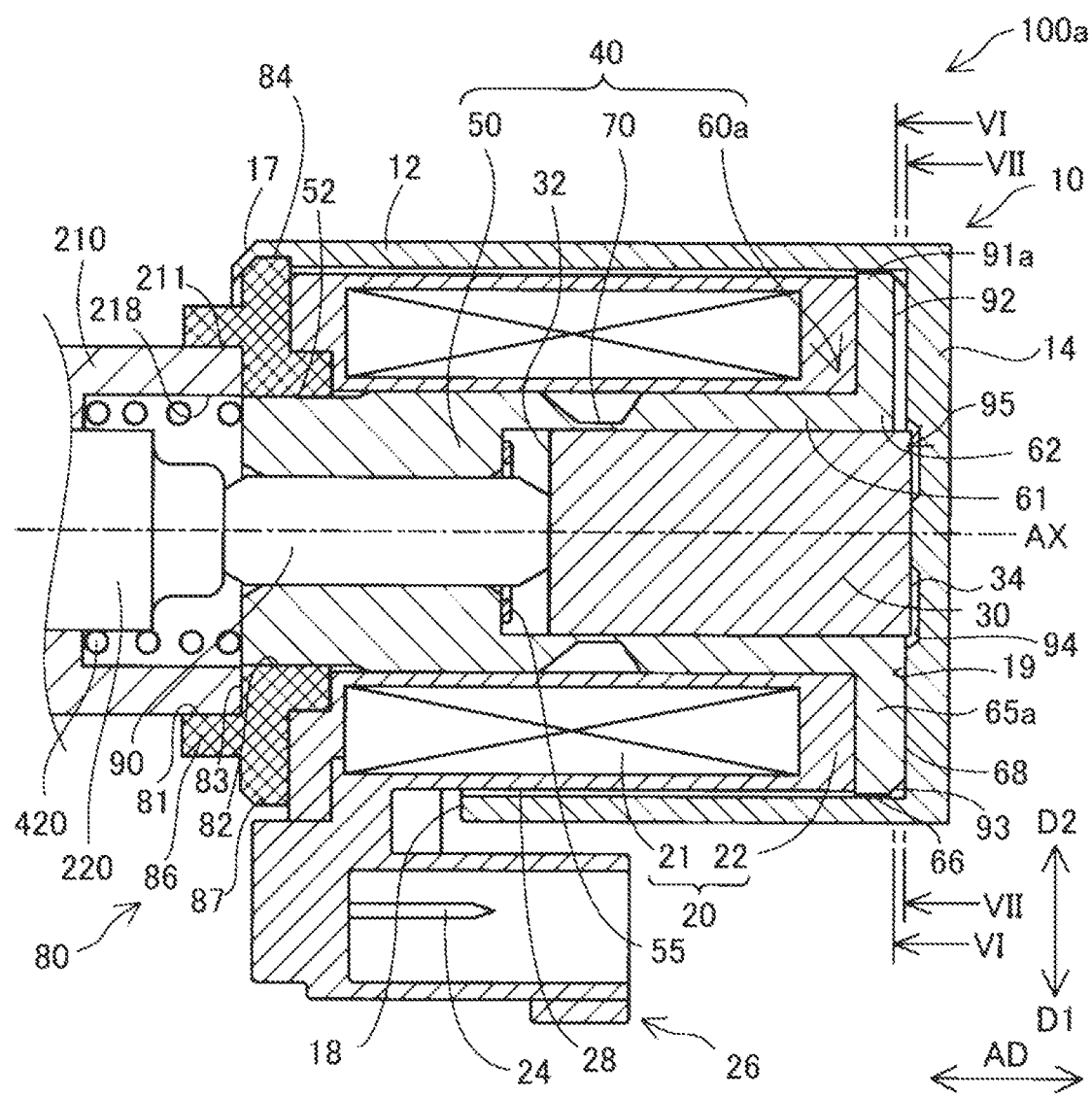
FIG. 5 is a cross-sectional view showing a detailed configuration of a solenoid according to a second embodiment.

A solenoid 100a of a second embodiment shown in FIG. 5 is different from the solenoid 100 of the first embodiment in that a sliding core 60a is provided in place of the sliding core 60. The sliding core 60a has a magnetic flux transfer portion 65a instead of the magnetic flux transfer portion 65. Since the other configurations are the same as those of the solenoid 100 of the first embodiment, the same configurations are designated by the same reference numerals, and detailed description thereof will be omitted.

Figure 6:
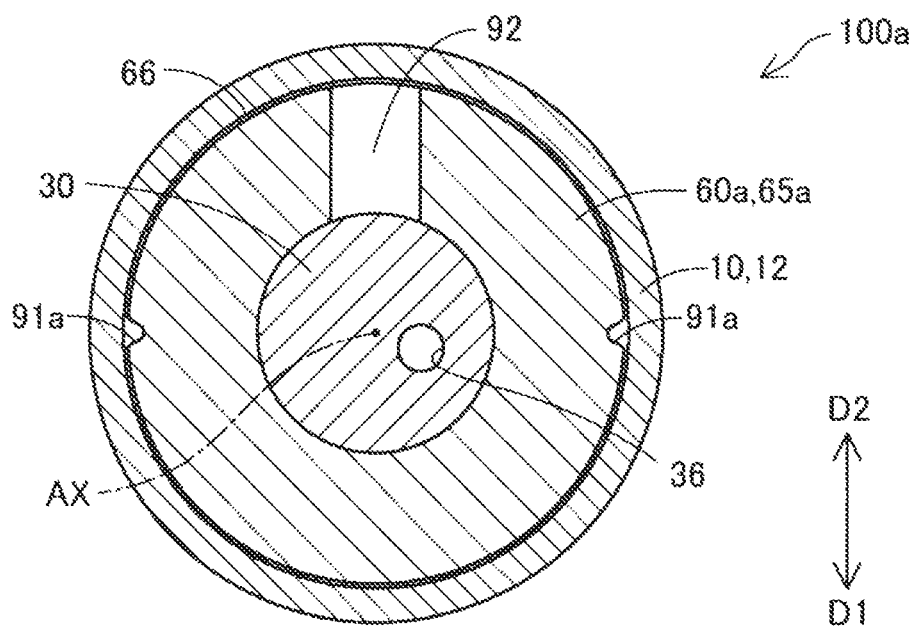
FIG. 6 is a cross-sectional view taken along line VI-VI of FIG. 5.

As shown in FIG. 6, two first breathing passages 91a are formed on the outer peripheral surface 66 of the magnetic flux transfer portion 65a. In the present embodiment, the two first breathing passage 91a are positioned at positions displaced from each other by about 180° in the circumferential direction, and both are formed at positions different from those in the vertical direction D2.

Figure 7:
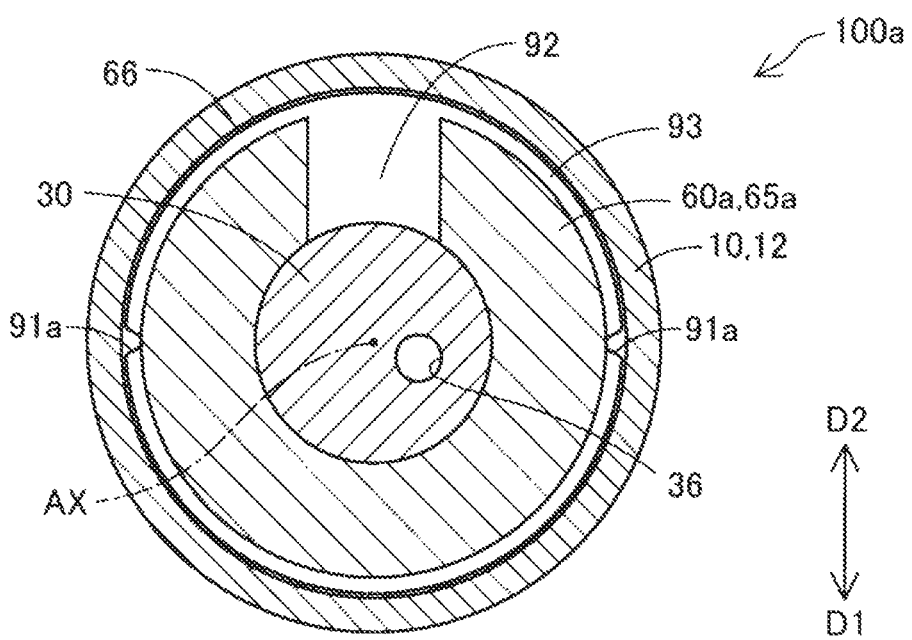
FIG. 7 is a cross sectional view taken along line VII-VII of FIG. 5.

As shown in FIGS. 5 and 7, similarly to the first embodiment, the second breathing passage 92 along the radial direction is formed on the first facing surface 68 of the magnetic flux transfer portion 65a in a range that is in the vertical direction D2 when the solenoid 100 is assembled. Therefore, in the present embodiment, the two first breathing passage 91a and the second breathing passage 92 are formed in different positions in the circumferential direction. In the present embodiment, the second breathing passage 92 is formed by expanding the flow passage toward the side closer to the bottom portion 14 in the axial direction AD.

As shown in FIG. 7, a third breathing passage 93 is formed in the magnetic flux transfer portion 65a. The third breathing passage 93 communicates the first breathing passage 91 and the second breathing passage 92 in the circumferential direction. In the present embodiment, the third breathing passage 93 is formed at an outer edge portion of the first facing surface 68 shown in FIG. 5. In other words, the third breathing passage 93 is formed at the end of the outer peripheral surface 66 of the magnetic flux transfer portion 65a on the bottom portion 14 side in the axial direction AD. Further, in the present embodiment, the third breathing passage 93 is formed over the entire circumferential direction as shown in FIG. 7.

The fluid flowing into the breathing path 28 through the notch portion 18 flows into the plunger chamber 95 through the first breathing passage 91a along the axial AD, the third breathing passage 93 along the circumferential direction, and the second breathing passage 92 along the radial direction in this order.

According to the solenoid 100a of the second embodiment described above, the same effects as that of the first embodiment are obtained. In addition, the third breathing passage 93 is formed in the magnetic flux transfer portion 65a, and the positions of the first breathing passage 91a and the second breathing passage 92 in the circumferential direction are formed differently from each other. Therefore, the maze structure can be complicated, and foreign matter contained in the fluid flowing into the first breathing passage 91a can be suppressed from reaching the second breathing passage 92.

Further, since the third breathing passage 93 is formed over the entire circumferential direction, the third breathing passage 93 is located in a range connecting the first breathing passage 91a and the second breathing passage 92 in the circumferential direction, and in addition, is also located in a range that does not directly connect the first breathing passage 91a and the second breathing passage 92. Therefore, in the portion of the third breathing passage 93 located in the ground direction D1, for example, foreign matter contained in the fluid flowing into the first breathing passage 91a can be deposited. Therefore, it is possible to further suppress the foreign matter contained in the fluid flowing into the first breathing passage 91a from reaching the second breathing passage 92. Further, the third breathing passage 93 is formed over the entire circumferential direction. Therefore, even if the positions of the first breathing passage 91a and the second breathing passage 92 in the circumferential direction are slightly displaced due to the manufacturing error, it is possible to prevent the cross-sectional area at a communication point between the first breathing passage 91a and the third breathing passage 93 and at a communication point between the third breathing passage 93 and the second breathing passage 92 from becoming excessively narrow. It is possible to suppress an increase in flow path resistance. Therefore, in a situation where the viscosity of the hydraulic oil as a fluid increases, for example, when the solenoid 100a is used in a low temperature environment, the increase in the resistance value can be suppressed, so that it is possible to prevent the smooth sliding of the plunger 30 from being hindered.

Further, the two first breathing passages 91a are formed in the magnetic flux transfer portion 65a. Therefore, even if the position of the first breathing passage 91a in the circumferential direction is slightly displaced due to the manufacturing error, it is possible to prevent the cross-sectional area at a communication point between the first breathing passage 91a and the third breathing passage 93 from becoming excessively narrow and it is possible to suppress an increase in flow path resistance.

Further, since the first breathing passage 91, the second breathing passage 92, and the third breathing passage 93 are all formed in the magnetic flux transfer portion 65, the positions of the first breathing passage 91, the second breathing passage 92, and the third breathing passage 93 in the circumferential direction can be regulated only by the stator core 40. Therefore, when assembling the solenoid 100a, the step of adjusting the circumferential position of the first breathing passage 91a with respect to the second breathing passage 92 and the circumferential position of the third breathing passage 93 with respect to the second breathing passage 92 can be omitted.

C. Third Embodiment

Figure 8:
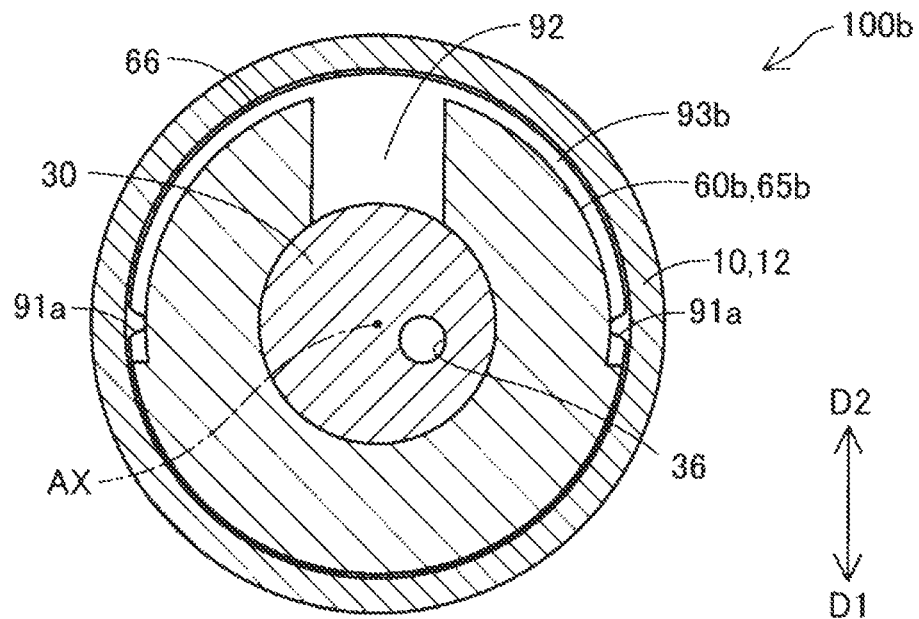
FIG. 8 is a cross-sectional view showing a detailed configuration of a solenoid according to a third embodiment.

A solenoid 100b of a third embodiment shown in FIG. 8 is different from the solenoid 100a of the second embodiment in that a sliding core 60b is provided in place of the sliding core 60a. The sliding core 60b has a magnetic flux transfer portion 65b instead of the magnetic flux transfer portion 65a. Since the other configurations are the same as those of the solenoid 100a of the second embodiment, the same configurations are designated by the same reference numerals, and detailed description thereof will be omitted. FIG. 8 shows a cross section similar to that of FIG. 7, and the cross section corresponding to FIG. 6 is the same as that of the second embodiment.

A third breathing passage 93b is formed in the magnetic flux transfer portion 65b. The third breathing passage 93b is formed in a range of about 180° centered on the position in the vertical direction D2 in the circumferential direction. Therefore, the third breathing passage 93b is formed in a range not including the ground direction D1 in the state where the solenoid 100b is assembled. In other words, the third breathing passage 93b is formed not including a position displaced by 180° from the position where the second breathing passage 92 is formed in the circumferential direction. With such a configuration, the third breathing passage 93b is formed only in the range connecting the first breathing passage 91a and the second breathing passage 92 in the circumferential direction at the shortest distance.

According to the solenoid 100b of the third embodiment described above, the same effects as that of the second embodiment are obtained. In addition, the third breathing passage 93b is formed in the circumferential direction without including a range deviated by 180° from the position where the second breathing passage 92 is formed. Therefore, as compared with the configuration in which the third breathing passage 93b is formed over the entire circumferential direction, it is possible to suppress a decrease in the degree of freedom in manufacturing, when the magnetic flux transfer portion 65b is formed by forging.

D. Fourth Embodiment

Figure 9:
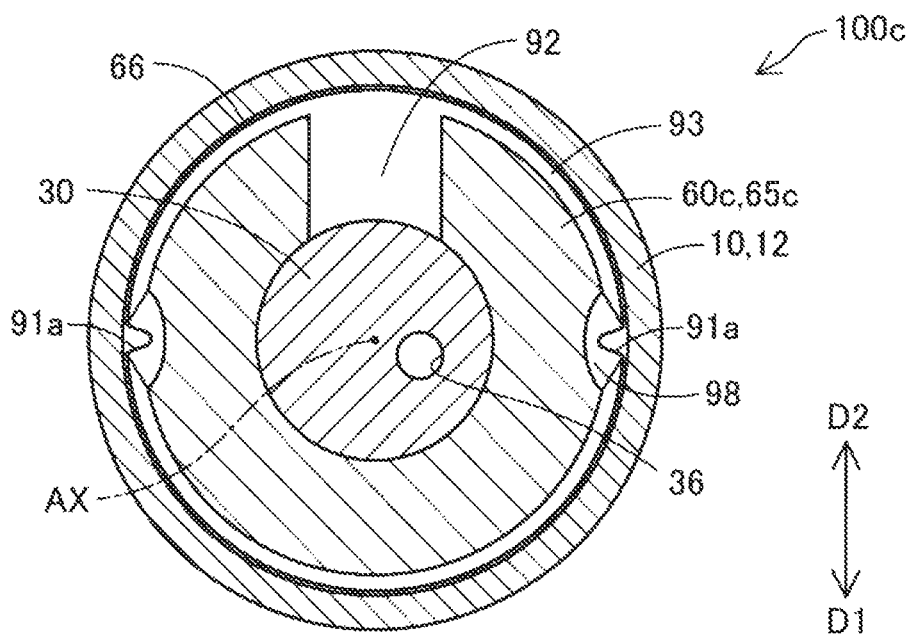
FIG. 9 is a cross-sectional view showing a detailed configuration of a solenoid according to a fourth embodiment.

A solenoid 100c of a fourth embodiment shown in FIG. 9 is different from the solenoid 100a of the second embodiment in that a sliding core 60c is provided in place of the sliding core 60a. The sliding core 60c has a magnetic flux transfer portion 65c instead of the magnetic flux transfer portion 65a. Since the other configurations are the same as those of the solenoid 100a of the second embodiment, the same configurations are designated by the same reference numerals, and detailed description thereof will be omitted. FIG. 9 shows a cross section similar to that of FIG. 7, and the cross section corresponding to FIG. 6 is the same as that of the second embodiment.

The first breathing passage 91a formed in the magnetic flux transfer portion 65c communicates with a storage portion 98. The storage portion 98 is formed so as to be surrounded by the magnetic flux transfer portion 65c and the yoke 10, and retains foreign matter contained in the fluid flowing through the first breathing passage 91a. In the present embodiment, the storage portion 98 has a configuration in which a circumferential dimension of the end portion of the first breathing passage 91a on the side close to the bottom portion 14 in the axial direction AD is larger than the circumferential dimension of the other portion of the first breathing passage 91a in the axial direction AD. In other words, the circumferential dimension of the first breathing passage 91a on the side far from the bottom portion 14 is smaller than the circumferential dimension of the first breathing passage 91a on the side closer to the bottom portion 14. Further, in the present embodiment, the first breathing passage 91a is formed so that the dimension in the circumferential direction expands as it approaches the bottom portion 14, but the circumferential dimension of the first breathing passage 91a other than the end of the first breathing passage 91a on the side closer to the bottom portion 14 may be formed to be constant.

According to the solenoid 100c of the fourth embodiment described above, the same effect as that of the second embodiment is obtained. In addition, since the first breathing passage 91a communicates with the storage portion 98, foreign matter contained in the fluid flowing into the first breathing passage 91a can be stayed in the storage portion 98. Therefore, since it is possible to suppress the foreign matter from flowing into the third breathing passage 93, it is possible to prevent the foreign matter from flowing into the plunger chamber 95. Further, the first breathing passage 91a is formed on the outer peripheral surface 66 of the magnetic flux transfer portion 65c. The storage portion 98 has a configuration in which a circumferential dimension of the end portion of the first breathing passage 91a on the side close to the bottom portion 14 in the axial direction AD is larger than the circumferential dimension of the other portion of the first breathing passage 91a in the axial direction AD. Therefore, the storage portion 98 can be easily formed by forging.

E. Other Embodiments

E-1. Other Embodiment 1

The configurations of the first breathing passages 91 and 91a and the second breathing passage 92 in each of the above embodiments are merely examples and can be variously changed. For example, the first breathing passages 91 and 91a are formed on the inner peripheral surface of the cylindrical portion 12 of the yoke 10 in place of the outer peripheral surface 66 of the magnetic flux transfer portions 65, 65a to c, or in addition to the outer peripheral surface 66. Further, for example, the first breathing passages 91 and 91a may be formed by one groove, or may be formed so that two or more arbitrary number of grooves are arranged in the circumferential direction. Further, for example, the second breathing passage 92 may be formed on the second facing surface 19 of the bottom portion 14 of the yoke 10 in place of the first facing surface 68 of the magnetic flux transfer portions 65, 65a to 65c, or in addition to the first facing surface 68. Further, for example, the number of the second breathing passage 92 is not limited to one, and the second breathing passage 92 may be formed so that an arbitrary number of two or more grooves are arranged side by side in the circumferential direction. Further, for example, the second breathing passage 92 may be formed in a range that does not become the vertical direction D2 in the circumferential direction when the solenoids 100 and 100a to 100c are assembled. Further, for example, the first breathing passages 91 and 91a and the second breathing passage 92 are not limited to the linear groove shape, respectively, and may have an arbitrary groove shape such as a curved shape or a wavy shape. That is, in general, at least one first breathing passage 91, 91a along the axial AD is formed on at least one of the outer peripheral surface 66 of the magnetic flux transfer portions 65, 65a to 65c and the inner peripheral surface of the cylindrical portion 12. The second breathing passage 92 along the radial direction for communicating the inside of the magnetic flux transfer portions 65, 65a to 65c with the first breathing passage 91, 91a is formed on at least one of the first facing surface 68 facing the bottom portion 14 of the magnetic flux transfer portions 65, 65a to 65c and the second facing surface 19 facing the magnetic flux transfer portions 65, 65a to 65c of the bottom portion 14. Even with such a configuration, the same effect as that of each of the above described embodiments can be obtained. However, as in each of the above embodiments, the first breathing passages 91 and 91a and the second breathing passage 92 are formed in the magnetic flux transfer portions 65, 65a to 65c. Therefore, it is possible to prevent the structure of the yoke 10 from becoming complicated, and it is possible to suppress an increase in the manufacturing process of the yoke 10.

E-2. Other Embodiment 2

In the solenoids 100a to 100c of the second to fourth embodiments, the third breathing passages 93 and 93b are formed in the magnetic flux transfer portions 65a to 65c, but may be formed on the inner peripheral surface of the cylindrical portion 12 of the yoke 10 or the second facing surface 19 of the bottom portion 14 in place of the magnetic flux transfer portions 65a to 65c or in addition to the magnetic flux transfer portions 65a to 65c. That is, in general, the third breathing passages 93 and 93b for communicating the first breathing passage 91a and the second breathing passage 92 in the circumferential direction may be formed on at least one of the magnetic flux transfer portions 65a to c and the yoke 10. Even with such a configuration, the same effect as that of each of the above described embodiments can be obtained.

E-3. Other Embodiment 3

In the solenoid 100c of the fourth embodiment, the storage portion 98 has a configuration in which a circumferential dimension of the end portion of the first breathing passage 91a on the side close to the bottom portion 14 in the axial direction AD is larger than the circumferential dimension of the other portion of the first breathing passage 91a in the axial direction AD. However, the present disclosure is not limited to this configuration. For example, an arbitrary storage portion 98 capable of staying foreign matter contained in the fluid flowing through the first breathing passages 91 and 91a may be formed on the inner peripheral surface of the cylindrical portion 12 of the yoke 10 and the second facing surface 19 of the bottom portion 14. Even with such a configuration, the same effect as that of the fourth embodiment can be obtained.

E-4. Other Embodiment 4

The configurations of the solenoids 100, 100a to 100c of each of the above embodiments are merely examples and can be changed in various ways. For example, the recess 94 of the yoke 10 is not limited to the annular shape, and may be formed in any shape that allows the second breathing passage 92 and the breathing hole 36 to communicate with each other. Further, instead of the recess 94 of the yoke 10, a protrusion protruding toward the plunger 30 side may be formed on the central axis AX of the bottom portion 14. For example, in place of the notch portion 18 of the yoke 10, or in addition to the notch portion 18, any radial through hole formed in the cylindrical portion 12 of the yoke 10 may function as an inflow portion of the fluid existing in the mounting environment of the solenoids 100, 100a to 100c. Further, for example, the elastic member 420 is not limited to the compression coil spring, and may be composed of any elastic member such as a disc spring or a leaf spring. The elastic member 420 may be arranged between the coil portion 20 and the magnetic flux transfer portions 65, 65a to 65c in the axial direction AD instead of the elastic member accommodating portion 218 to urge the magnetic flux transfer portions 65, 65a to 65c. Further, for example, the inner diameter of the base portion 80 may be substantially constant in the axial direction AD. Further, for example, instead of fixing the base portion 80 to the thin-walled portion 17 of the yoke 10 to each other, a flange portion whose diameter is expanded outward in the radial direction is formed at the end portion of the sleeve 210, and the flange portion may be fixed to each other with the thin-walled portion 17 of the yoke 10. Even with such a configuration, the same effect as that of each of the above described embodiments can be obtained.

E-5. Other Embodiment 5

The solenoids 100, 100a to 100c of each of the above embodiments may be assembled so that the positions of the connector 26 and the notch portion 18 in the circumferential direction are in the ground direction D1, but the solenoids are not limited to being positioned in the ground direction D1 and are positioned in any direction. The solenoids 100, 100a to 100c of each of the above embodiments are applied to the linear solenoid valve 300 for controlling the hydraulic pressure of the hydraulic oil supplied to the automatic transmission for vehicles, and function as an actuator for driving the spool valve 200. However, the present disclosure is not limited to this configuration. For example, the solenoid valve is not limited to being mounted on the valve body provided on the outer surface of the transmission case, but may be mounted on any hydraulic device that requires control of hydraulic pressure. Further, for example, instead of the spool valve 200, an arbitrary valve such as a poppet valve may be driven, and instead of the valve, an arbitrary driven body such as a switch may be driven.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid, comprising:
a coil portion configured to generate a magnetic force when energized;
a yoke including a cylindrical portion along an axial direction and a bottom portion formed along a direction intersecting the axial direction, and being configured to accommodate the coil portion;
a columnar plunger configured to slide in the axial direction;
a stator core including
a magnetic attraction core arranged in the axial direction to face a distal end surface of the plunger and configured to attract magnetically the plunger by a magnetic force generated by the coil portion,
a sliding core having a tubular core portion arranged inside the coil portion in a radial direction orthogonal to the axial direction and accommodating the plunger, and a first magnetic flux transfer portion formed from a core end which is an axial end portion of the core portion and faces the bottom portion toward an outside in the radial direction so as to transfer magnetic flux between the yoke and the core portion, and
a magnetic flux passage suppressing portion configured to suppress passage of magnetic flux between the sliding core and the magnetic attraction core; and
a second magnetic flux transfer portion that is disposed radially outside a magnetic attraction core end portion, which is an end in the axial direction of the magnetic attraction core and is opposite to a side facing the distal end surface, and is configured to transfer the magnetic flux between the magnetic attraction core and the cylindrical portion,
wherein
the first magnetic flux transfer portion is gap-fitted in the cylindrical portion, at least one first breathing passage along the axial direction is formed on at least one of an outer peripheral surface of the first magnetic flux transfer portion and an inner peripheral surface of the cylindrical portion,
a second breathing passage along the radial direction for communicating an inside of the first magnetic flux transfer portion with the first breathing passage is formed on at least one of a first facing surface facing the bottom portion in the first magnetic flux transfer portion and a second facing surface facing the first magnetic flux transfer portion at the bottom portion,
the first breathing passage and the second breathing passage are formed in different positions in a circumferential direction,
a third breathing passage that communicates the first breathing passage and the second breathing passage in the circumferential direction is formed in at least one of the first magnetic flux transfer portion and the yoke and in a range connecting the first breathing passage and the second breathing passage in the circumferential direction, and
the second breathing passage is provided only on one side with respect to a center line.

2. The solenoid according to claim 1, wherein
the first breathing passage and the second breathing passage are formed at a same position in the circumferential direction.

3. The solenoid according to claim 1, wherein
the second breathing passage is formed in a range in the circumferential direction that is a vertical direction when the solenoid is assembled.

4. A solenoid, comprising:
a coil portion configured to generate a magnetic force when energized;
a yoke including a cylindrical portion along an axial direction and a bottom portion formed along a direction intersecting the axial direction, and being configured to accommodate the coil portion;
a columnar plunger configured to slide in the axial direction;
a stator core including
a magnetic attraction core arranged in the axial direction to face a distal end surface of the plunger and configured to attract magnetically the plunger by a magnetic force generated by the coil portion,
a sliding core having a tubular core portion arranged inside the coil portion in a radial direction orthogonal to the axial direction and accommodating the plunger, and a first magnetic flux transfer portion formed from a core end which is an axial end portion of the core portion and faces the bottom portion toward an outside in the radial direction so as to transfer magnetic flux between the yoke and the core portion, and
a magnetic flux passage suppressing portion configured to suppress passage of magnetic flux between the sliding core and the magnetic attraction core; and
a second magnetic flux transfer portion that is disposed radially outside a magnetic attraction core end portion, which is an end in the axial direction of the magnetic attraction core and is opposite to a side facing the distal end surface, and is configured to transfer the magnetic flux between the magnetic attraction core and the cylindrical portion,
wherein
the first magnetic flux transfer portion is gap-fitted in the cylindrical portion, at least one first breathing passage along the axial direction is formed on at least one of an outer peripheral surface of the first magnetic flux transfer portion and an inner peripheral surface of the cylindrical portion,
a second breathing passage along the radial direction for communicating an inside of the first magnetic flux transfer portion with the first breathing passage is formed on at least one of a first facing surface facing the bottom portion in the first magnetic flux transfer portion and a second facing surface facing the first magnetic flux transfer portion at the bottom portion, and
the first breathing passage communicates with a storage portion formed by being surrounded by the first magnetic flux transfer portion and the yoke so as to stay a foreign matter contained in a fluid flowing through the first breathing passage in the storage portion,
the first breathing passage is formed on the outer peripheral surface of the first magnetic flux transfer portion,
the second breathing passage is formed on the first facing surface facing the bottom portion in the first magnetic flux transfer portion, and
the storage portion is formed on the outer peripheral surface of the first magnetic flux transfer portion.

5. The solenoid according to claim 4, wherein
the first breathing passage is formed on the outer peripheral surface, and
the storage portion has a configuration in which a circumferential dimension of the end portion of the first breathing passage on a side close to the bottom portion in the axial direction is larger than the circumferential dimension of the other portion of the first breathing passage in the axial direction.

* * * * *